United States Patent
Bhatnagar

(10) Patent No.: US 11,540,535 B2
(45) Date of Patent: Jan. 3, 2023

(54) SYSTEMS FOR MANAGING WEIGHT LOSS AND BODY MASS

(71) Applicant: Societe des Produits Nestle SA, Vevey (CH)

(72) Inventor: Sandeep Bhatnagar, Ballwin, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 738 days.

(21) Appl. No.: 16/220,492

(22) Filed: Dec. 14, 2018

(65) Prior Publication Data

US 2019/0191737 A1 Jun. 27, 2019

Related U.S. Application Data

(60) Provisional application No. 62/608,720, filed on Dec. 21, 2017.

(51) Int. Cl.
| | | |
|---|---|---|
| *A23K 50/40* | (2016.01) | |
| *A23L 33/00* | (2016.01) | |
| *A23K 10/00* | (2016.01) | |
| *A23K 20/147* | (2016.01) | |

(52) U.S. Cl.
CPC ............ *A23K 10/00* (2016.05); *A23K 20/147* (2016.05); *A23K 50/40* (2016.05); *A23L 33/30* (2016.08); *A23V 2002/00* (2013.01)

(58) Field of Classification Search
CPC ........ A23K 50/40; A23K 50/42; A23K 50/48; A23L 33/20; A23L 22/30; A23L 33/40
See application file for complete search history.

(56) References Cited

U.S. PATENT DOCUMENTS

| | | |
|---|---|---|
| 5,804,596 A | 9/1998 | Majeed et al. |
| 6,204,291 B1 | 3/2001 | Sunvold et al. |
| 7,744,930 B2 | 6/2010 | Fisher et al. |
| 7,850,997 B2 | 12/2010 | Romero et al. |
| 7,989,009 B2 | 8/2011 | Kandaswami et al. |
| 8,143,215 B2 | 3/2012 | Hirsch |
| 8,158,683 B2 | 4/2012 | Romero et al. |
| 8,226,973 B2 | 7/2012 | Pan |
| 8,968,804 B2 | 3/2015 | Pan |
| 2003/0072846 A1 | 4/2003 | King |
| 2004/0077556 A1 | 4/2004 | Chinery |
| 2007/0082026 A1 | 4/2007 | Aimutis, Jr. et al. |
| 2010/0109876 A1 | 5/2010 | Schmid-Schonbein et al. |
| 2010/0126588 A1 | 5/2010 | Jeanrot |
| 2011/0281245 A1 | 11/2011 | Mansour |
| 2014/0056851 A1* | 2/2014 | Pan ................... G09B 19/0092 424/93.1 |
| 2015/0010669 A1 | 1/2015 | Kimura |
| 2015/0313261 A1* | 11/2015 | Jewell ................. A61P 37/02 426/2 |
| 2015/0374014 A1* | 12/2015 | Gumudavelli ....... A23K 20/163 426/2 |
| 2016/0235094 A1* | 8/2016 | Mao ..................... A23K 20/26 |
| 2018/0078214 A1* | 3/2018 | Flanagan .............. A61B 5/107 |

FOREIGN PATENT DOCUMENTS

| | | |
|---|---|---|
| WO | 0197605 A1 | 12/2001 |
| WO | 03061705 A1 | 7/2003 |
| WO | 2012007568 A1 | 1/2012 |
| WO | 2014031836 A1 | 2/2014 |
| WO | 2014149434 A1 | 9/2014 |
| WO | 2017174383 A1 | 10/2017 |

OTHER PUBLICATIONS

Serisier et al., Increasing volume of food by incorporating air reduces energy intake, Journal of Nutritional Science (2014), vol. 3, e59, p. 1-5. (Year: 2014).*
Parthasarathy, Mukund, "Bulk Density and palabability of dry pet foods", www.petfoodindustry.com 2010 XP055566685.
International Search Report and Written Opinion, PCT/IB2018/050134, dated Mar. 19, 2019.

* cited by examiner

*Primary Examiner* — W A Moore

(57) ABSTRACT

The present invention provides a system for providing a health benefit to a companion animal comprising: a maintenance pet food comprising fat, protein, and carbohydrates, where the maintenance pet food can be complete and balanced and has a density ranging from 400 g/l to 600 g/l; and a reduced caloric pet food comprising fat, protein, and carbohydrates, where the reduced caloric pet food can be complete and balanced and has a density ranging from 300 g/l to 450 g/l. Generally, the reduced caloric pet food can have a caloric content of 50% to 90% of the maintenance pet food in about the same volume and the reduced caloric pet food can have a density of 70% to 85% of the maintenance pet food.

12 Claims, No Drawings

SYSTEMS FOR MANAGING WEIGHT LOSS AND BODY MASS

CROSS REFERENCE TO RELATED APPLICATIONS

This application claims priority to U.S. Provisional Application No. 62/608,720 filed Dec. 21, 2017, the disclosure of which is incorporated herein by this reference.

FIELD OF THE INVENTION

The invention relates generally to systems for preserving lean body mass and maintaining higher energy expenditure during weight loss and particularly to systems for use with feeding patterns for promoting weight loss while preserving lean body mass and maintaining higher energy expenditure.

BACKGROUND OF THE INVENTION

Description of Related Art

When managing an animal's weight, particularly promoting weight loss, it is a very common practice to reduce caloric intake by restricting the amount of food available to the animal on a chronic and daily basis. Generally, restricting daily food intake chronically causes the animal to be hungry. Hunger is an unpleasant state that often causes one or more unwanted behaviors by the hungry animal, e.g., begging, seeking food, binge eating, and the like. In addition, managing weight loss by chronic and daily caloric reduction may cause undesirable results that affect body composition. Animals that lose weight often lose both fat body mass and lean body mass and reduce their daily energy expenditure. Reduced daily energy expenditure caused by chronic daily caloric reduction during weight loss makes animals to regain their lost weight easily and makes it very difficult for the animals to maintain their ideal body weight after weight loss. Therefore, it is frequently more desirable when losing weight to lose excess fat body mass while preserving as much lean body mass as possible and maintaining higher daily energy expenditure.

Methods for managing weight loss and body mass are known in the art. For example, U.S. Pat. No. 8,158,683 discloses using extracts of aronia to promote weight loss. U.S. Pat. No. 8,143,215 discloses promoting weight loss by applying satiety-enhancing or appetite-suppressing composition comprising tastant onto food. U.S. Pat. No. 7,989,009 discloses a method for promoting weight loss using black tea extract, white tea extract, guarana extract, oolong tea extract, green mate extract, thiamine, choline and N-acetylcysteine. U.S. Pat. No. 6,204,291 discloses a process for promoting weight loss in overweight dogs using L-carnitine. U.S. Pat. No. 7,744,930 discloses compositions, methods and kits for enhancing weight loss while inhibiting loss of lean body mass that use soy protein and chromium in form of salt or chelate. US20040077556A1 discloses methods for promoting weight loss and lean muscle mass using epigallocatechin gallate, caffeine, and 1-tyrosine. U.S. Pat. No. 7,850,997 discloses methods of enhancing lean body mass and exercise performance using L-arginine alpha amino n-butyrate. U.S. Pat. No. 5,804,596 discloses a method for using forskohlin for promoting lean body mass and treating mood disorders. US20070082026A1 discloses methods for reducing caloric intake and controlling weight using dietary fiber. U.S. Pat. No. 8,226,973 discloses using isoflavones for reducing accumulation of body fat in male mammals. US20110281245A1 discloses a system for regulating caloric intake by managing food dishes. U20100109876A1 discloses devices, systems, and methods for controlling caloric intake by modifying consumer behavior. US20030072846A1 discloses packages useful for controlling dietary caloric intake. US20100126588A1 discloses a programmed intermittent automatic watering system for animals.

These methods are often at least partially effective for managing weight loss and/or lean body mass and related conditions. However, these methods may still result in reduced daily expenditure, and hunger and its undesirable behavioral side effects. There is, therefore, a need for new systems for promoting weight loss, particularly while preserving lean body mass and maintaining higher energy expenditure, that avoid, at least in part, the undesirable behaviors and reduced daily energy expenditure associated with weight loss achieved by reducing daily caloric intake chronically.

SUMMARY OF THE INVENTION

The present invention provides a system for providing a health benefit to a companion animal. In one embodiment, the system can comprise a maintenance pet food comprising fat, protein, and carbohydrates, wherein the maintenance pet food is complete and balanced and has a density ranging from 400 to 600 g/l and a reduced caloric pet food comprising fat, protein, and carbohydrates, wherein the reduced caloric pet food is complete and balanced and has a density ranging from 300 to 450 g/l. In one aspect, the reduced caloric pet food can have a caloric content of 50% to 90% of the maintenance pet food in about the same volume. In another aspect, the reduced caloric pet food can have a density of 70% to 85% of the maintenance pet food.

Such systems can be implemented for inducing weight loss in an animal, preserving lean body mass, preserving lean body mass during weight loss by an animal, preventing a reduction in daily energy expenditure by an animal, reducing the risk of regaining weight by an animal after weight loss, and ameliorating undesirable animal behaviors associated with reduced caloric intake. The systems can involve intermittently feeding an animal a first pet food containing calories that meet the animal's maintenance energy requirements and a second pet food containing calories that do not meet the animal's maintenance energy requirements or intermittently feeding an animal a first pet food containing calories that do not meet the animal's maintenance energy requirements and a second pet food containing calories that meet the animal's maintenance energy requirements. Surprisingly, the animal loses essentially the same amount of weight as if the animal had been fed only the pet food that does not meet the animal's maintenance energy requirements on a continuous and daily basis. Further, the animal's behavior is more desirable when fed using the feeding pattern, e.g., there is less begging for food, seeking food, binge eating, voracious eating, anxiety, aggression, depression, excessive vocalization, and the like. Similarly, functions often associated with weight loss are beneficially affected, e.g., preventing or minimizing loss of lean body mass by the animal while the animal is losing weight due to reduced caloric intake, preventing a reduction in energy metabolism by an animal while the animal is losing weight due to reduced caloric intake, reducing the risk of regaining weight by an animal after the animal has lost weight.

Other and further objects, features, and advantages of the present invention will be readily apparent to those skilled in the art.

DETAILED DESCRIPTION OF THE INVENTION

Definitions

The term "animal" means a human or other animal that can benefit from one or methods for promoting weight loss by an animal, promoting weight loss by an animal while preventing or minimizing loss of lean body mass by the animal, preventing a reduction in energy metabolism by an animal, reducing the risk of regaining weight by an animal after weight loss, and ameliorating undesirable animal behaviors associated with reduced caloric intake, including avian, bovine, canine, equine, feline, hircine, murine, ovine, and porcine animals.

The term "companion animal" means domesticated animals such as cats, dogs, rabbits, guinea pigs, ferrets, hamsters, mice, gerbils, horses, cows, goats, sheep, donkeys, pigs, and the like. In one embodiment, the companion animal can be a dog or a cat.

The term "intermittent period(s)" or "intermittently" means a first period and a second period of the same of different durations of time that reoccur at defined intervals. For example, daily intermittent periods would involve doing one act for one day, doing a different act on the following day, and possibly repeating the pattern for as many two day periods as needed or desirable. Similarly, one act such as feeding an animal could be done for a week and a second act such as feeding an animal a different pet food could be done for two weeks, and the cycle repeated for a year or for the lifetime of the animal. The same would apply for periods of multiple days, weeks, months, quarters, years, and the like, e.g., daily, every other day, every other three days, every other four days, every other five days, every other six days, weekly, every other week, every other two weeks, every other three weeks, monthly, every other month, quarterly, yearly, and the like.

The term "in conjunction" means that an animal is fed for a first period a first pet food containing calories that meet the animal's maintenance energy requirements and fed for a second period a second pet food containing calories that do not meet the animal's maintenance energy requirements according to the invention and the animal is administered a different compound, composition, or other agent (1) together in dietary composition or (2) separately at the same or different frequency using the same or different administration routes at about the same time or periodically. "Periodically" means that the agent is administered on a dosage schedule acceptable for a specific agent and that the food is fed to an animal routinely as appropriate for the particular animal. "About the same time" generally means that the food and agent are administered at the same time or within about 72 hours of each other. "In conjunction" specifically includes administration schemes wherein agent is administered for a prescribed period and the dietary compositions of the invention are administered indefinitely.

The term "complete and balanced" when referring to a food composition or pet food means a food composition or pet food that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO).

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual dietary compositions of the invention physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

The term "about" means plus or minus 20%, preferably plus or minus 10%, more preferably plus or minus 5%, most preferably plus or minus 2%.

All percentages expressed herein are by dry weight unless expressed otherwise.

The invention is not limited to the particular methodology, protocols, and reagents described herein because they may vary. Further, the terminology used herein is for the purpose of describing particular embodiments only and is not intended to limit the scope of the present invention.

As used herein, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

The Invention

The present invention provides a system for providing a health benefit to a companion animal. In one embodiment, the system can comprise a maintenance pet food comprising fat, protein, and carbohydrates, wherein the maintenance pet food is complete and balanced and has a density ranging from 400 to 600 g/l and a reduced caloric pet food comprising fat, protein, and carbohydrates, wherein the reduced caloric pet food is complete and balanced and has a density ranging from 300 to 450 g/l. In one aspect, the reduced caloric pet food can have a caloric content of 50% to 90% of the maintenance pet food in about the same volume. In another aspect, the reduced caloric pet food can have a density of 70% to 85% of the maintenance pet food.

Such systems can be implemented for inducing weight loss in an animal, preserving lean body mass, preserving lean body mass during weight loss by an animal, preventing a reduction in daily energy expenditure by an animal, reducing the risk of regaining weight by an animal after weight loss, and ameliorating undesirable animal behaviors associated with reduced caloric intake. The systems can involve intermittently feeding an animal a first pet food containing calories that meet the animal's maintenance energy requirements and a second pet food containing calories that do not meet the animal's maintenance energy requirements or intermittently feeding an animal a first pet food containing calories that do not meet the animal's maintenance energy requirements and a second pet food containing calories that meet the animal's maintenance energy requirements. Surprisingly, the animal loses essentially the same amount of weight as if the animal had been fed only the pet food that does not meet the animal's maintenance energy requirements on a continuous and daily basis. Further, the animal's behavior is more desirable when fed using the feeding pattern, e.g., there is less begging for food, seeking food, binge eating, voracious eating, anxiety, aggression, depression, excessive vocalization, and the like. Similarly, functions often associated with weight loss are beneficially affected, e.g., preventing or minimizing loss of lean body mass by the animal while the animal is losing weight due to reduced caloric intake, preventing a reduction in energy metabolism by an animal while the animal is losing weight due to reduced caloric intake, reducing the risk of regaining weight by an animal after the animal has lost weight.

While feeding for a the caloric reduction period and for a caloric maintenance period as described is often sufficient, the preferred methods require that the feeding pattern be repeated for at least two cycles, for several cycles, for as long as the animal benefits from the feeding pattern (e.g., achieves a desired weight loss), or for the life of the animal.

In various embodiments, the caloric reduction period and the caloric maintenance period are periods of the same duration or periods of a different duration, e.g., the caloric reduction period is a one day period and the caloric maintenance period is a two day period. In one aspect, the caloric reduction period and the caloric maintenance period are intermittent periods of the same duration. In another aspect, the caloric reduction period and the caloric maintenance period are intermittent periods of different durations.

Generally, the reduced caloric pet food contains fewer calories than the maintenance pet food in any number of calories sufficient to maintain a higher energy expenditure during weight loss, preserve lean body mass during weight loss, or achieve any related or associated benefit described herein in about the same volume. In one embodiment, the caloric reduction diet contains from about 50% to about 90% of the calories as contained in the maintenance pet food. In other aspects, the caloric reduction diet can contain from about 60% to about 80%, from about 70% to about 80%, or even about 75% of the calories as contained in the maintenance pet food. Any suitable amount is acceptable depending upon the desired results.

Additionally, the maintenance pet food can have various densities that allow for a complete and balanced pet food that has acceptable palatability. In one embodiment, the density can be from 400 g/l to 600 g/l. In another aspect, the density can be from 450 g/l to 550 g/l. In other aspects, the density can be from 475 g/l to 525 g/l, or even 500 g/l to 525 g/l.

Further, the reduced caloric pet food can have various densities that allow for a complete and balanced pet food that has acceptable palatability with a reduced caloric content. In one embodiment, the density can be from 300 g/l to 450 g/l. In another aspect, the density can be from 350 g/l to 425 g/l. In other aspects, the density can be from 370 g/l to 420 g/l, or even 370 g/l to 400 g/l.

Generally, the reduced caloric pet food has a density that is lower than the maintenance pet food. In one embodiment, the reduced caloric pet food has a density of 70% to 85% of the maintenance pet food. In one aspect, the reduced caloric pet food has a density of 75% to 80% of the maintenance pet food.

The maintenance and reduced caloric pet foods generally comprise protein, fat, and carbohydrates as well as other ingredients such that the pet foods are complete and balanced. However, as discussed herein, the reduced caloric pet food has been modified through formulary changes as well as processing changes to allow a reduced caloric content as compared to the maintenance pet food but having about the same volume per feeding.

In one embodiment, the reduced caloric pet food can have about the same amount of protein as the maintenance pet food. In another embodiment, the reduced caloric pet food can have a carbohydrate content within 10% of the maintenance pet food. In one aspect, the carbohydrate content can be within 5%. In other aspects, the carbohydrate content can be within 3%, 2%, 1%, or even the same as the maintenance pet food. In one embodiment, the fat content of the reduced caloric pet food can be about 40% to about 75% of the maintenance pet food. In one aspect, the fat content of the reduced caloric pet food can be about 50% to about 70% of the maintenance pet food. In other aspects, the fat content of the reduced caloric pet food can be about 55% to about 70%, about 55% to about 70%, or even 60% to 70% of the maintenance pet food. Generally, the combined amount of carbohydrate and protein of the reduced caloric diet can be higher than the combined amount of carbohydrate and protein of the maintenance pet food.

In one embodiment, the volume of the reduced caloric pet food is within 5% of the maintenance pet food. In another embodiment, the volume of the reduced caloric pet food is within 2% of the maintenance pet food. Such volumes can be based on serving size. For example, one serving size of the maintenance pet food can have a volume that is within 5% or 2% or other percentage of the serving size of the reduced caloric pet food.

The pet food compositions disclosed herein can be any food formulated for consumption by a companion animal. In an embodiment, the pet food composition provides complete nutrition as defined by the Association of American Feed Control Officials (AAFCO) for a canine or feline.

The pet food composition can comprise meat, such as emulsified meat. Examples of suitable meat include poultry, beef, pork, lamb and fish, especially those types of meats suitable for pets. The meat can include any additional parts of an animal including offal. Some or all of the meat can be provided as one or more meat meals, namely meat that has been dried and ground to form substantially uniform-sized particles and as defined by AAFCO. Additionally or alternatively, vegetable protein can be used, such as pea protein, corn protein (e.g., ground corn or corn gluten), wheat protein (e.g., ground wheat or wheat gluten), soy protein (e.g., soybean meal, soy concentrate, or soy isolate), rice protein (e.g., ground rice or rice gluten) and the like.

The pet food compositions disclosed herein can comprise vegetable oil, a flavorant, a colorant and water. Suitable vegetable oils include soybean oil, corn oil, cottonseed oil, sunflower oil, canola oil, peanut oil, safflower oil, and the like. Examples of suitable flavorants include yeast, tallow, rendered animal meals (e.g., poultry, beef, lamb, pork), flavor extracts or blends (e.g., grilled beef), animal digests, and the like. Suitable colorants include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan.

The pet food compositions disclosed herein can optionally include additional ingredients, such as other grains and/or other starches additionally or alternatively to flour, amino acids, fibers, sugars, animal oils, aromas, other oils additionally or alternatively to vegetable oil, humectants, preservatives, polyols, salts, oral care ingredients, antioxidants, vitamins, minerals, probiotic microorganisms, bioactive molecules or combinations thereof.

Suitable starches include a grain such as corn, rice, wheat, barley, oats, soy and the like, and mixtures of these grains, and can be included at least partially in any flour. Suitable humectants include salt, sugars, propylene glycol and polyhydric glycols such as glycerin and sorbitol, and the like. Suitable oral care ingredients include alfalfa nutrient concentrate containing chlorophyll, sodium bicarbonate, phosphates (e.g., tricalcium phosphate, acid pyrophosphates, tetrasodium pyrophosphate, metaphosphates, and orthophosphates), peppermint, cloves, parsley, ginger and the like. Examples of suitable antioxidants include butylated hydroxyanisole ("BHA") and butylated hydroxytoluene ("BHT"), vitamin E (tocopherols), and the like.

Non-limiting examples of vitamins that can be used include Vitamins A, B-complex (such as B-1, B-2, B-6 and B-12), C, D, E and K, niacin and acid vitamins such as pantothenic acid and folic acid and biotin. Non-limiting examples of suitable minerals include calcium, iron, zinc, magnesium, iodine, copper, phosphorus, manganese, potassium, chromium, molybdenum, selenium, nickel, tin, silicon, vanadium, boron and the like.

Non-limiting examples of suitable preservatives include potassium sorbate, sorbic acid, sodium methyl para-hydroxybenzoate, calcium propionate, propionic acid, and combinations thereof.

Specific amounts for each additional ingredient in the pet food compositions disclosed herein will depend on a variety of factors such as the ingredient included in the first edible material and any second edible material; the species of animal; the animal's age, body weight, general health, sex, and diet; the animal's consumption rate; the purpose for which the food product is administered to the animal; and the like.

In one embodiment, the methods of the invention are implemented in conjunction with the administration of one or more weight loss agents. Any weight loss agent that is compatible with the feeding patterns of the invention can be used in the invention. In various embodiments, the weight loss agent is one or more of carnitine, isoflavones, pyruvate, fish oil, DHA, EPA, fibers, calcium, resistant starch, medium chain triglycerides, green tea extract, phentermine, diethylpropion, orlistat, sibutramine, megestrol, phenylpropanolamine, oxandrolone, oleoylethanolamide, probiotics that promote weight loss, ephedra, conjugated linoleic acid, glucomannan, and the like.

Preferably, the methods are useful for managing weight loss and related functions described herein for companion animals, particularly those whose diet is controlled by an owner or caregiver. Most preferably, the animals are dogs and cats.

In a further aspect, the invention provides kits suitable for implementing the methods of the invention. The kits comprise in separate containers in a single package or in separate containers in a virtual package, as appropriate for the kit component, (1) a complete and balanced first food composition containing calories that meet an animal's maintenance energy requirements; (2) a complete and balanced second food composition containing calories that do meet the animal's maintenance energy requirements; and (3) instructions for using the food compositions for at least one of promoting weight loss by an animal, promoting weight loss by an animal while preventing or minimizing loss of lean body mass by the animal, preventing a reduction in energy metabolism by an animal, reducing the risk of regaining weight by an animal after weight loss, and ameliorating undesirable animal behaviors associated with reduced caloric intake by feeding the animal for a first period the first food composition and feeding the animal for a second period the second food composition. In certain embodiments, the kits further comprise one or more of one or more weight loss agents.

When the kit comprises a virtual package, the kit is limited to instructions in a virtual environment in combination with one or more physical kit components. Generally, the kit contains the food compositions and other physical components in amounts sufficient to implement the methods of the invention and the virtual package contains the instructions relating to using the physical components to implement the methods of the invention.

In another aspect, the invention provides a means for communicating information about or instructions for one or more of preventing or minimizing loss of lean body mass during weight loss by the animal, preventing a reduction in energy metabolism during weight loss by an animal, reducing the risk of regaining weight by an animal after weight loss, and ameliorating undesirable animal behaviors associated with reduced caloric intake by feeding the animal for caloric maintenance period a caloric maintenance diet containing calories that meet the animal's maintenance energy requirements and feeding the animal for a caloric reduction period a caloric reduction diet containing calories that do not meet the animal's maintenance energy requirements, and optionally a weight loss agent. The means comprises a document, digital storage media, optical storage media, audio presentation, or visual display containing the information or instructions. In certain embodiments, the communication means is a displayed web site, visual display, brochure, product label, package insert, advertisement, handout, public announcement, audiotape, videotape, DVD, CD-ROM, computer readable chip, computer readable card, computer readable disk, computer memory, or combination thereof containing such information or instructions.

Useful information includes one or more of (1) recommended feeding schedules for the animal, particularly based on the animal's species and body condition (e.g., overweight or obese), (2) recommended weight loss agents to be administered in conjunction with the use of the recommended feeding pattern, and (3) contact information for animals or their caregivers to use if they have a question about the invention and its use.

EXAMPLES

The invention can be further illustrated by the following examples, although it will be understood that these examples are included merely for purposes of illustration and are not intended to limit the scope of the invention unless otherwise specifically indicated.

Example 1—Pet Food Densities

Various commercial pet foods were modified by extruding at settings as listed in Table 1; resulting densities also listed in Table 1. However, such densities were not sufficient to achieve a sufficient caloric reduction in the same volume as found in the original, unmodified commercial pet food. For example, when ingredient mix was extruded at 66.7 lb/min (2T/h) using a moderate to high shear screw profile at standardized operating conditions of 230 rpm screw speed, 28% process moisture and a variable restriction of 2 inches, a density of 405 g/l was achieved. Reducing throughput rate and decreasing secondary restriction opening helped in reducing the density to some extent. Even at smallest possible secondary restriction of 0.3 inch, density decreased only by 16%. Reducing the process moisture, or using a smaller sized die hole also helped to decrease it further to 23.4% (still below 25%) but product appearance and shape was not acceptable. Similar observation was made when screw speed was increased to 270 and 300 rpm. Kibbles started to look torn and product uniformity and shape was not acceptable. Thus, process conditions alone failed to achieve the density/calorie target of 25% reduction.

TABLE 1

| Pet Food | Dry Rate (lb/min) | Secondary Variable Restriction Opening (in) | Screw Speed (rpm) | Process Moisture (%) | Density (g/l) | Caloric Content % reduction |
|---|---|---|---|---|---|---|
| 1 | 66.7 | 2 | 230 | 28 | 406 | NA |
| 2 | 58.3 | 2 | 230 | 28 | 385 | 4.9 |
| 3 | 58.3 | 1 | 230 | 28 | 360 | 11.1 |
| 4 | 58.3 | 0.3 | 230 | 28 | 340 | 16.0 |
| 5 | 58.3 | 0.3 | 230 | 27 | 315 | 22.2++ |
| 6+ | 58.2 | 0.5 | 230 | 25++ | 310 | 23.4++ |

+Smaller die openings (reduced die open area)
++At process moisture of 25% product, product quality was not acceptable Example 2—Pet Food Formulations Various experimental pet food formulations were made to achieve a targeted reduced caloric content. Low caloric content is at least a 25% reduction as compared to a pet food providing 100% maintenance energy requirement. However, such formulations did not provide an acceptable palatability, for example, see two exemplary compositions as listed in Table 2.

TABLE 2

| Pet Food | Fat % | Protein % | Carbohydrate % | Species | Pal | Caloric Content |
|---|---|---|---|---|---|---|
| 1 | 12.2 | 43.9 | 23.97 | Cat | Fail | Low |
| 2 | 13.0 | 31.0 | 38.80 | Dog | Fail | Low |

Example 3—Hybrid Pet Food Formulations

Various experimental pet food formulations were made to achieve a targeted reduced caloric content as listed in Table 3. Such pet food used a modified formulation as well as modified processing to decrease density to provide a reduced caloric pet food having the same volume of a commercial pet food while achieving acceptable palatability.

TABLE 3

| Pet Food | Fat % | Protein % | Carbohydrate % | Caloric Content % | Species | Density (g/l) |
|---|---|---|---|---|---|---|
| 1 | 19.29 | 29.0 | 35.51 | 100 | Dog | 500 |
| 2 | 13.00 | 29.0 | 40.92 | 75 | Dog | 372 |
| 3 | 19.95 | 41.11 | 23.92 | 100 | Cat | 510 |
| 4 | 12.22 | 43.91 | 23.97 | 75 | Cat | 400 |

As shown in the above Tables, the present system required a formulation change as well as a processing change to overcome unknown difficulties associated with providing a system of pet foods that can be used to provide two differing caloric contents having the same volume and that was palatable to a companion animal.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. A system for providing a health benefit to a companion animal comprising:
    a maintenance pet food comprising fat, protein, and carbohydrates, wherein the maintenance pet food is complete and balanced and has a density ranging from 400 g/l to 600 g/l; and
    a reduced caloric pet food comprising fat, protein, and carbohydrates, wherein the reduced caloric pet food is complete and balanced and has a density ranging from 300 g/l to 450 g/l;
    wherein the reduced caloric pet food has a caloric content of 50% to 90% of the maintenance pet food in about the same volume and wherein the reduced caloric pet food has a density of 70% to 85% of the maintenance pet food.

2. The system of claim 1, wherein the reduced caloric pet food has a caloric content of 60% to 80% of the maintenance pet food.

3. The system of claim 1, wherein the reduced caloric pet food has a caloric content of 70% to 80% of the maintenance pet food.

4. The system of claim 1, wherein the maintenance pet food has a density ranging from 450 g/l to 550 g/l.

5. The system of claim 1, wherein the reduced caloric pet food has a density ranging from 350 g/l to 425 g/l.

6. The system of claim 1, wherein the reduced caloric pet food has a density of 75% to 80% of the maintenance pet food.

7. The system of claim 1, wherein the reduced caloric pet food has a fat content of 40% to 75% of the maintenance pet food.

8. The system of claim 1, wherein the reduced caloric pet food has a fat content of 50% to 70% of the maintenance pet food.

9. The system of claim 1, wherein the about the same volume is within 5% of the maintenance pet food.

10. The system of claim 1, wherein the about the same volume is within 2% of the maintenance pet food.

11. The system of claim 1, wherein the combined amount of carbohydrate and protein of the reduced caloric diet is higher than the combined amount of carbohydrate and protein of the maintenance pet food.

12. The system of claim 1, wherein the health benefit is at least one of weight loss, preserving leaning body mass, preventing or minimizing loss of lean body mass during the weight loss by the animal, preventing a reduction in energy metabolism by an animal, reducing the risk of regaining weight by an animal after weight loss, and ameliorating undesirable animal behaviors associated with reduced caloric intake.

* * * * *